Jan. 27, 1925. 1,524,117
H. TSCHERNING
MOLDING MACHINE
Filed Aug. 11, 1922  7 Sheets-Sheet 1
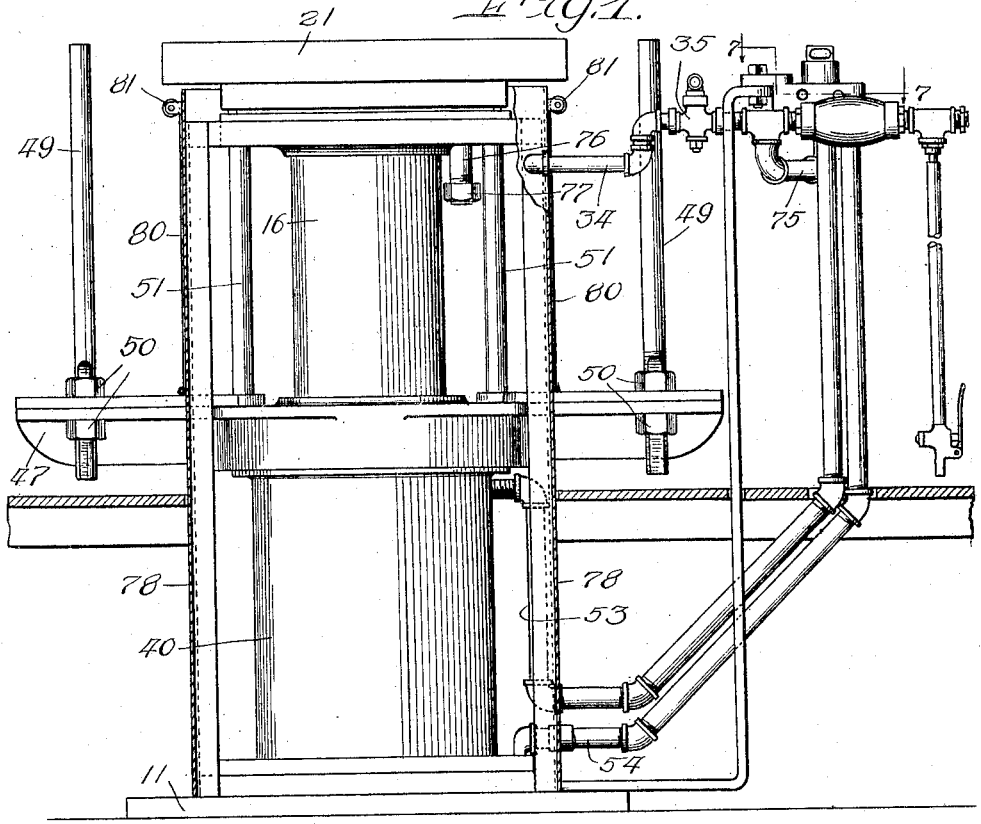
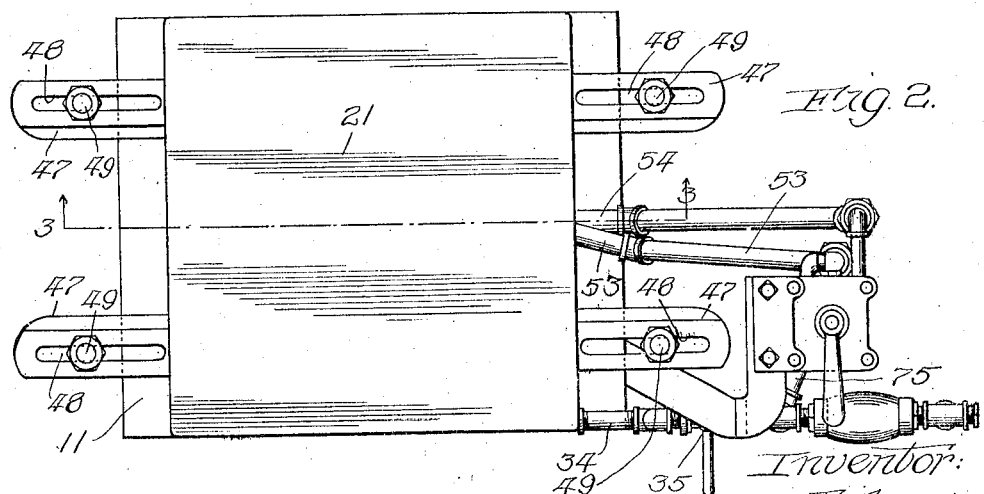
Inventor:
Henry Tscherning,
By Dyrenforth, Lee, Chritton & Wiles,
Attys.

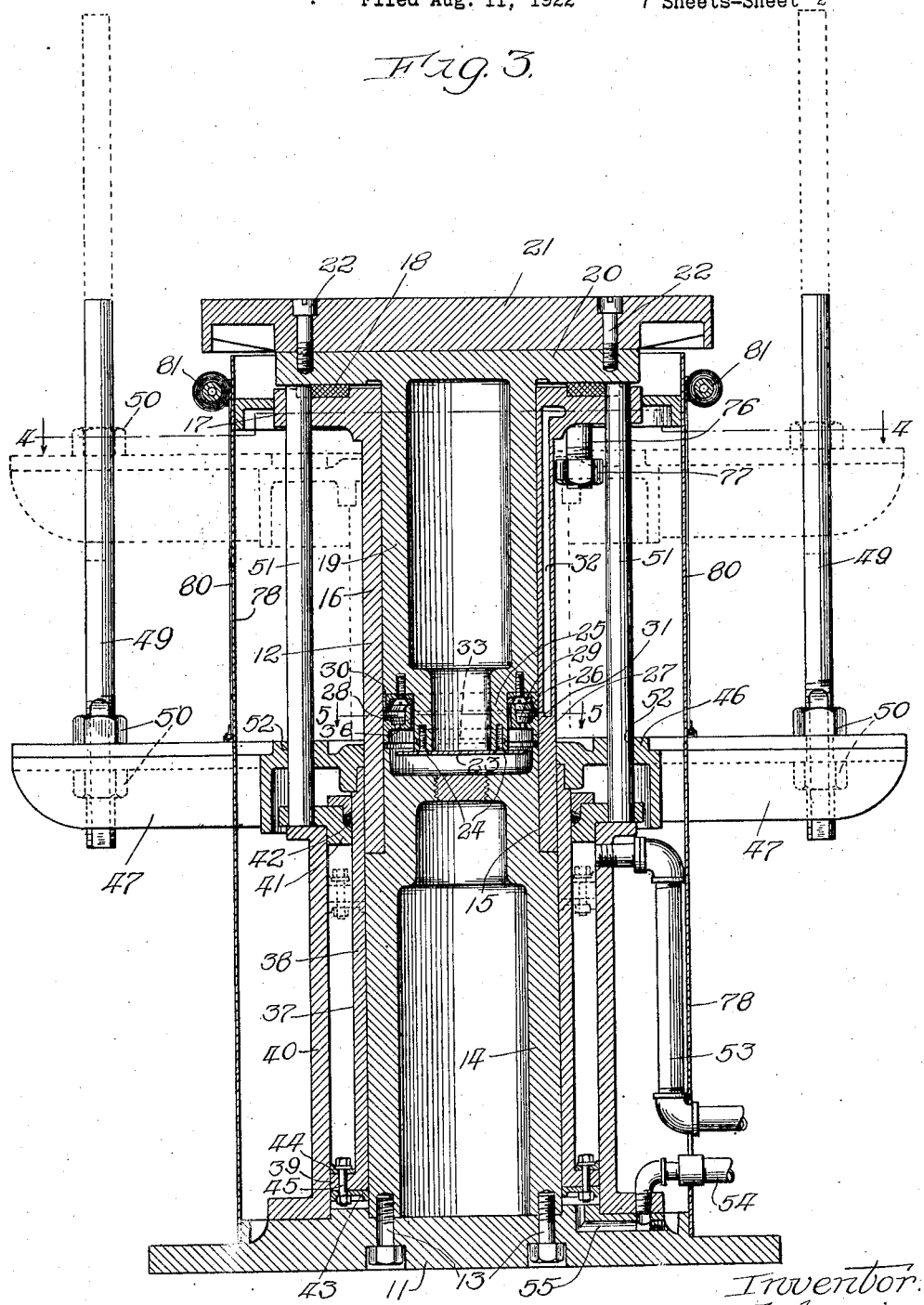

Jan. 27, 1925. 1,524,117
H. TSCHERNING
MOLDING MACHINE
Filed Aug. 11, 1922    7 Sheets-Sheet 3
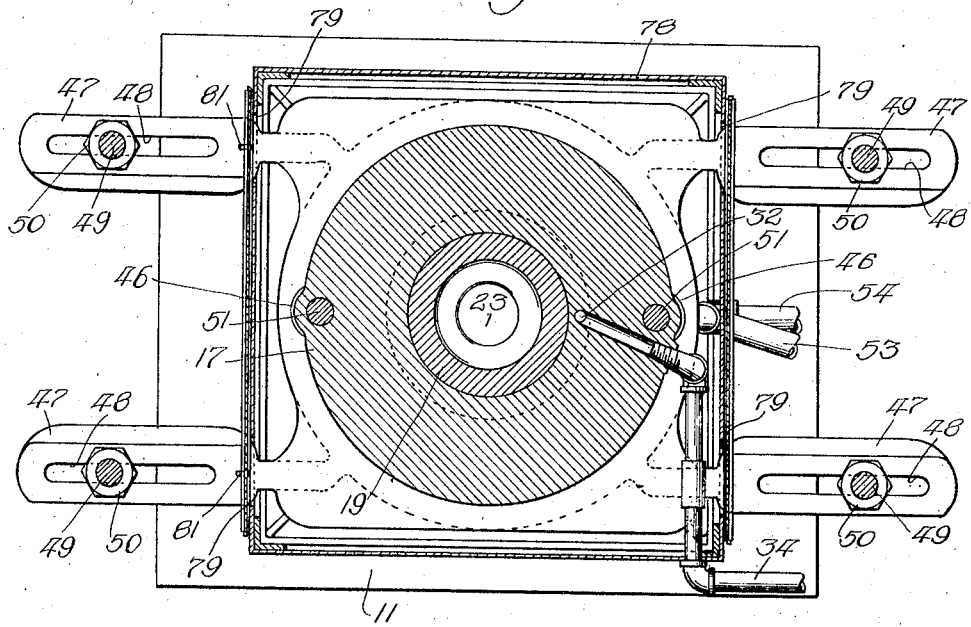
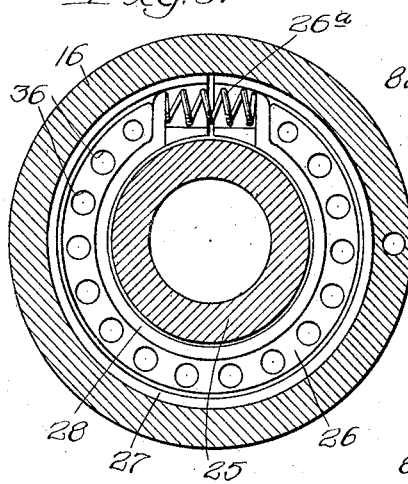
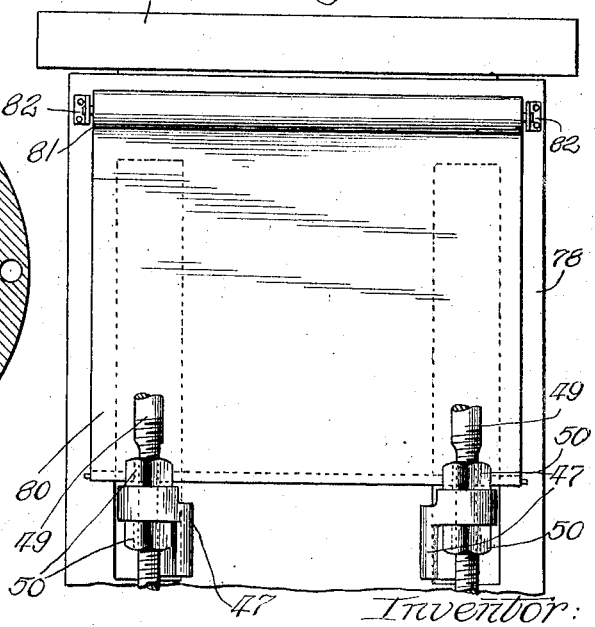
Inventor:
Henry T Tscherning,
By Lynnforth, Lee, Chritton & Wiles,
Attys.

Jan. 27, 1925.
H. TSCHERNING
1,524,117
MOLDING MACHINE
Filed Aug. 11, 1922    7 Sheets-Sheet 4
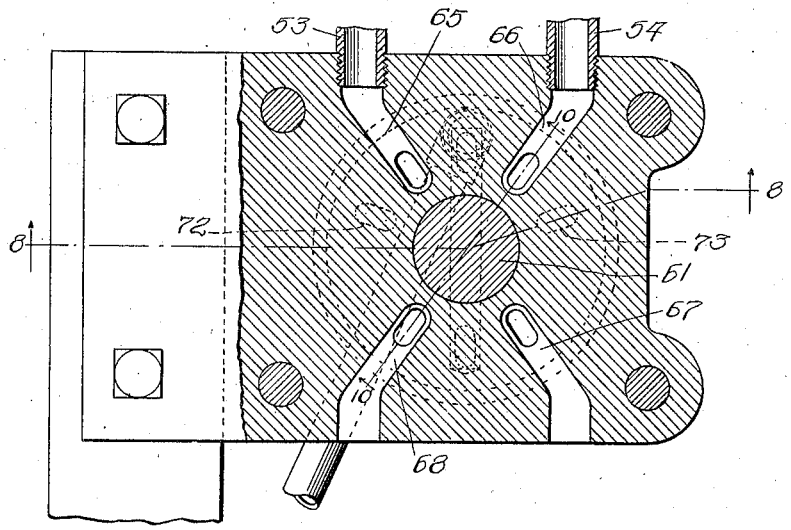
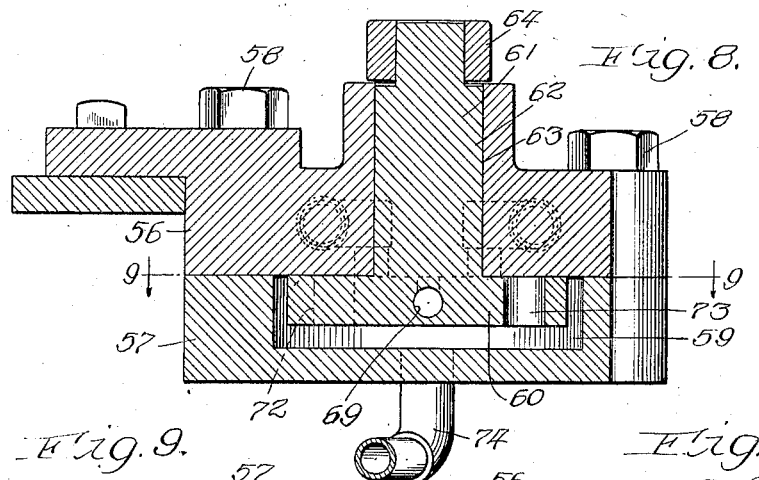
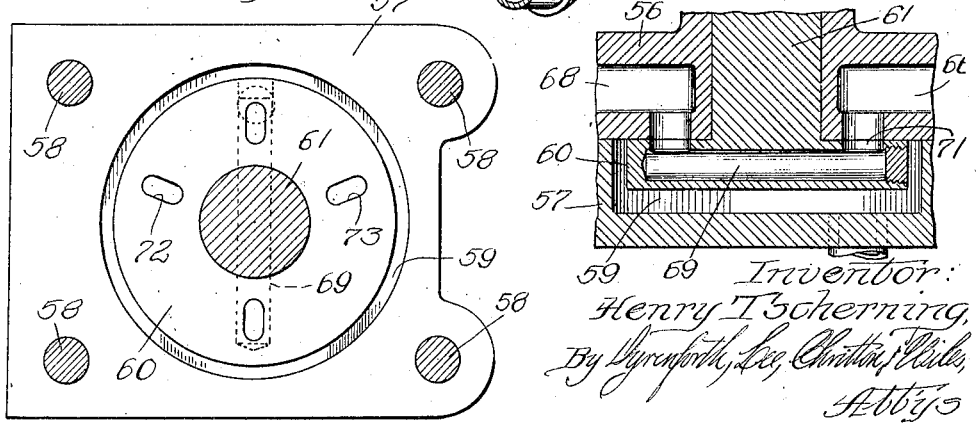
Inventor:
Henry Tscherning,
By Lyonforth, Lee, Chritton, Wiles
Attys

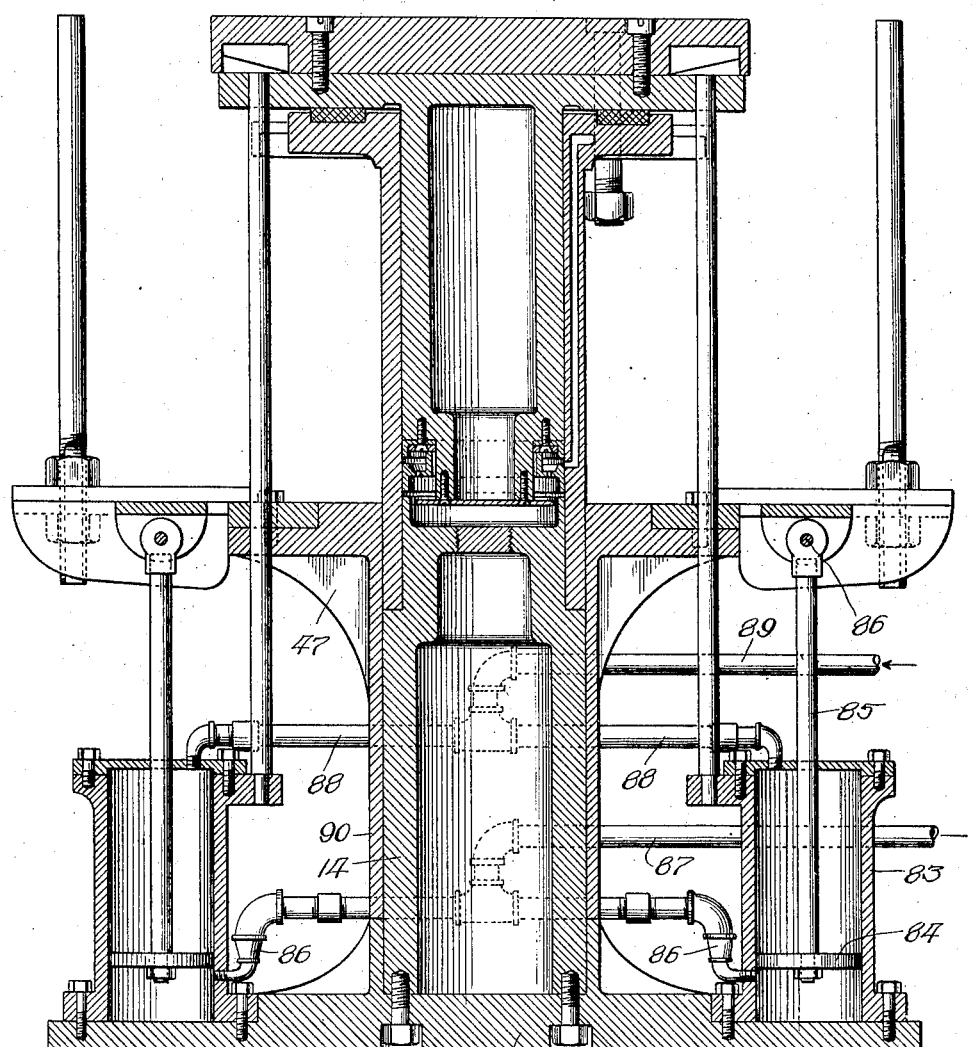

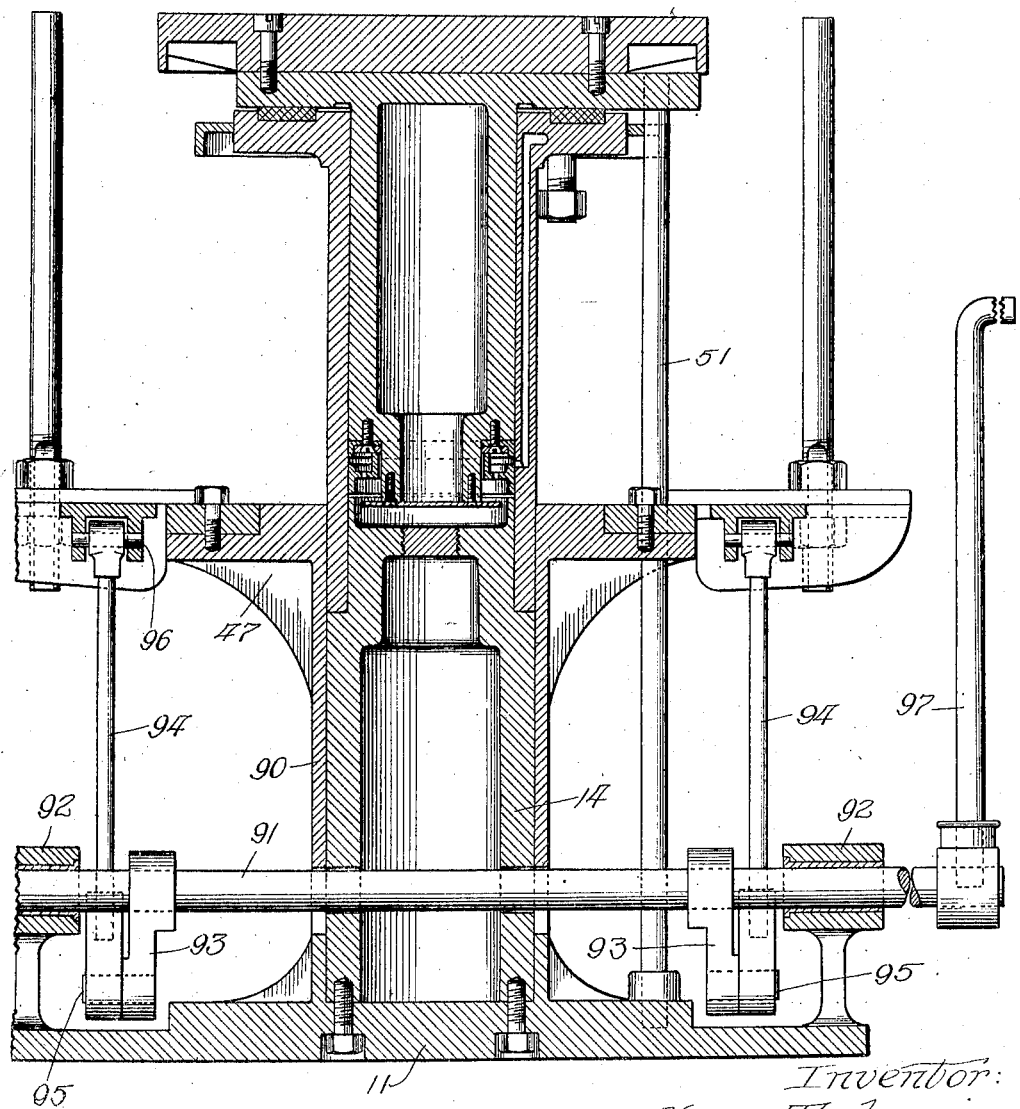

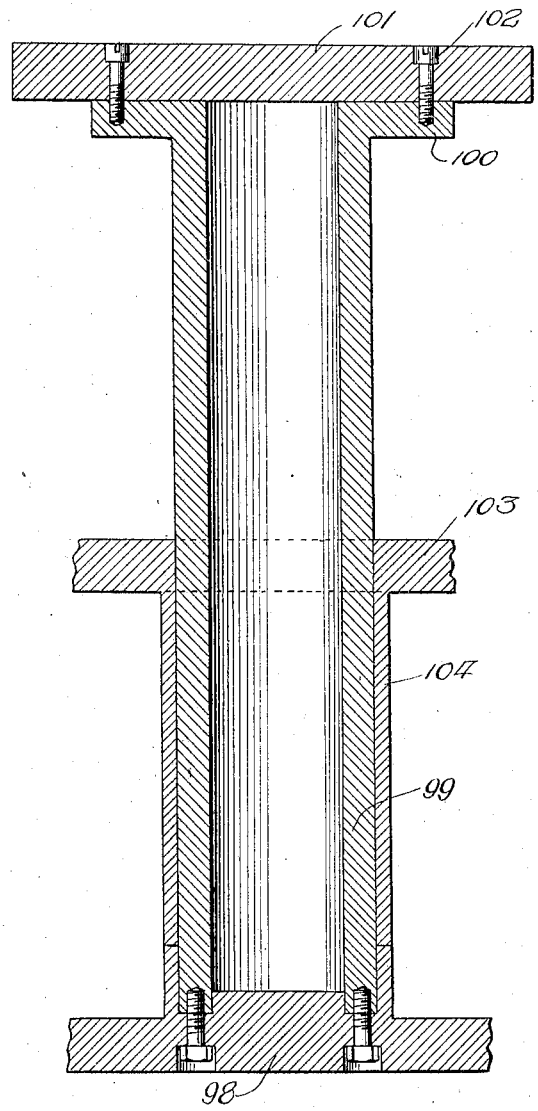

Patented Jan. 27, 1925.

1,524,117

UNITED STATES PATENT OFFICE.

HENRY TSCHERNING, OF FREEPORT, ILLINOIS, ASSIGNOR TO ARCADE MANUFACTURING COMPANY, OF FREEPORT, ILLINOIS, A CORPORATION OF ILLINOIS.

MOLDING MACHINE.

Application filed August 11, 1922. Serial No. 581,129.

*To all whom it may concern:*

Be it known that I, HENRY TSCHERNING, a citizen of the United States, residing at Freeport, in the county of Stephenson and State of Illinois, have invented a new and useful Improvement in Molding Machines, of which the following is a specification.

My invention relates, more particularly, to molding machines of the type employing an upright member which is surmounted by the pattern and which may, in accordance with the broader aspect of my invention, be either a post-like stationary member on which the pattern is supported, or a cylinder and piston structure forming a jolting mechanism wherein the pattern is supported on the piston.

My object is to provide a machine of the general type above referred to and more particularly where the upright structure is of the jolting type stated, and wherein means for stripping the mold from the pattern are provided, by which accurate molds may be made from deep, as well as shallow patterns, and to provide a machine capable of performing this work which will be comparatively simple and economical of construction and positive in operation.

Referring to the accompanying drawings:

Figure 1 is a view in side elevation of a machine constituting an embodiment of my invention, a portion of a casing employed for enclosing certain of the parts, and also the floor of the room into which the machine upwardly extends, being shown in section. Figure 2 is a plan view of the machine. Figure 3 is an enlarged view in vertical sectional elevation of the machine, the section being taken at the line 3—3 on Fig. 2 and viewed in the direction of the arrows, this view showing by full lines the position occupied by the mechanism during the jolting of the mold, and by dotted lines the position it assumes when the mold has been raised out of engagement with the pattern. Figure 4 is a section taken at the line 4—4 on Fig. 3 and viewed in the direction of the arrows, Figure 5 is an enlarged section taken at the line 5—5 on Fig. 3 and viewed in the direction of the arrows. Figure 6 is a view in side elevation with certain parts broken away, showing certain means employed at one side of the casing of the machine. Figure 7 is an enlarged section taken at the irregular line 7—7 on Fig. 1 and viewed in the direction of the arrows, showing certain details of the valve mechanism controlling the supply of fluid pressure to the stripping mechanism. Figure 8 is a section taken at the irregular line 8—8 on Fig. 7 and viewed in the direction of the arrows. Figure 9 is a section taken at the line 9—9 on Fig. 8 and viewed in the direction of the arrow. Figure 10 is a section taken at the line 10—10 on Fig. 7 and viewed in the direction of the arrows, the ported movable member of the valve being shown in the position it assumes when moved from the position shown in Fig. 7 to effect exhaust of the air from the bottom of the stripping cylinder; and Figures 11, 12 and 13, views in vertical sectional elevation of other embodiments of my invention, Fig. 13 showing the machine with certain parts broken away.

The particular construction of machine illustrated in Figs. 1 to 10 inclusive comprises a base plate 11 to which a cylinder, represented at 12 and rising centrally therefrom, is rigidly secured, as for example by the screws 13. The cylinder 12 is shown as formed of two sections, a lower, hollow, cylindrical section 14 into which the screws 13 extend, the upper end of the section 14 being annularly reduced, as represented at 15, and an upper, hollow, cylindrical section 16 which is telescoped at its lower end with the reduced portion 15 of the section 14 and is rigidly secured thereto in any desirable way, as for example by sweating it thereon, the outside diameters of the sections 14 and 12 being the same as shown. The cylinder structure 12 which forms a portion of the mold jolting mechanism and also a guide for the air-stripping mechanism, is provided at its upper extremity with an annular flange portion 17 preferably provided at its upper face with a ring 18 of vulcanized fibre to receive the impacts produced by the jolting piston hereinafter described, in descending.

The piston upon which the pattern (not shown) would be supported and through the medium of which the mold is jolted, is represented at 19, this piston being located, and slidable up and down in, the cylinder 12. The upper end of the piston presents a plate-like portion 20 the marginal edge portions of which extend directly above the flange 17, this plate being shown as supporting a table 21, secured to the plate 20 as through the medium of the screws 22. The piston 19 is provided for supporting, in any suitable way, the pattern to be used in making the mold.

Any suitable means may be employed for effecting the intermittent raising of the piston and the dropping of the same against the support for the piston, in the construction shown, the cylinder 12. The means shown for the purpose just stated comprise a plate 23 secured, as by the screws 24, to the bottom surface of the lower end of the piston 19 which is of reduced diameter, as represented at 25, the plate 23 extending laterally beyond the circumferential wall of the reduced portion 25. Surrounding the reduced portion 25 is a valve ring 26 shown as formed to present a lower ring-portion 27 having sliding fit in the lower portion of the cylinder section 16, an upper ring portion 28 extending adjacent the circumferential wall of the piston portion 25 and a ring portion 29 which extends crosswise of the piston and connects together the rings 27 and 28. The ring 26 which is preferably of the split type, as represented in Fig. 5, with a spring 26$^a$ positioned to yieldingly expand the ring, is of less height than the distance between the upper surface of the plate 23 and the extreme lower edge of a packing ring 30 carried by the piston 19. The cylinder section 16 contains an inlet port 31 for fluid pressure which, when the piston 19 is in lowermost position, represented in Fig. 3, opens into the space between the packing 30 and the ring 26, this port opening into a passage 32 in the cylinder wall which leads to air-controlling mechanism hereinafter described. The cylinder section 16 contains an exhaust port 33 in the lower portion of its wall, which is controlled by the movement of the valve ring 26. The passage 32 connects by a pipe 34 with any suitable source of fluid pressure, as for example compressed air, this pipe being provided with a handle-operated valve represented at 35 and controlling the flow of fluid pressure to the inlet port 31.

The operation of the jolting mechanism described is as follows: Assuming that the valve 35 is open to permit fluid pressure to be constantly supplied to the inlet 31, and the piston 19 to be in lowermost position as represented in Fig. 3, the air passes from the inlet 31 into the space between the ring 26 and the packing ring 30 of the piston 19 and thence below the ring 26 and beneath the plate 23, the ring 26 preferably containing openings 36 in the ring portion 29 thereof. Thus introducing fluid pressure into the cylinder 12 forces the piston 19 upwardly. The piston in moving upwardly engages, at its plate portion 23, with the ring portion 29, pushing the ring 26 upwardly to a position in which it closes the inlet port 31 and opens the exhaust port 33, whereupon the fluid pressure in the cylinder 12 escapes, permitting the piston to drop until arrested by the fibre ring 18, the various parts of the piston and valve mechanism described being such that the piston, in the final portion of its downward movement, engages the upper edge of the valve ring 26 forcing the latter to the position shown in Fig. 3 wherein the inlet 31 is again opened and the exhaust port 33 closed, whereupon fluid pressure again enters the cylinder 12 and the cycle of operations hereinbefore described are repeated, the mechanism continuing to operate automatically until the supply of fluid pressure is arrested.

The mechanism for stripping the mold from the pattern, following the packing of the sand in the mold about the pattern, by the jolting operation above described, comprises a piston, represented at 37 and formed of a cylindrical sleeve portion 38 which surrounds, and is vertically slidable on, the cylinder 12, a sliding fit being provided between these parts, the lower end of the sleeve 38 being provided with an annular outwardly-extending flange 39. The piston 37 is located within a cylinder 40 which is secured, and rises from, the base 11, this cylinder being concentric with the cylinder 12, and being formed at its upper end with a ring section 41 rigidly connected with the body portion of the cylinder 40 and provided with packing 42 which bears against the outer cylindrical wall of the piston 37. The flange 39 is shown as provided with packing rings 43 and 44 secured thereto as through the medium of the bolts 45, for the usual purpose. The piston 37 is provided at its upper end with a lateral enlargement 46 having the outwardly-projecting extensions 47 each represented as containing a longitudinally-extending slot 48 in which upright rods 49 are secured, as through the medium of the nuts 50 screwing on the threaded ends of these rods, these rods being thereby adjustable lengthwise of the extensions 47 to adapt the machine to the stripping of molds of different dimensions. The structure just described is provided for the purpose of separating the pattern and mold, by elevating the mold, the rods 49 being adjusted in the slots 48 into a position wherein they will extend immediately beneath the four corners of the flask, or, if a stripper plate is employed, beneath the four corners of this plate. The machine is also formed with parallel, upwardly-extending guide rods 51 which are secured in their lower ends in openings in the ring 41 and at their upper ends in openings in the flange 17, these rods extending through openings 52 in the portion 46 of the piston 37 and affording a guiding fit. Thus the piston 37 and the parts carried thereby will be prevented from rotating about the cylinder 12, in the operation of the piston 37.

Means are provided in the particular construction being described, for actuating the piston 37, by fluid pressure, the means shown for this purpose comprising a pipe 53 which opens at one end into the cylinder 40 adjacent the upper end of the latter, and at its opposite end into the valve mechanism represented in Figs. 7 to 10 inclusive. The means referred to also comprise a pipe 54 which opens at one end into a passage 55 in the base 11 which in turn opens into the cylinder 40 below the piston 37, the other end of this pipe communicating with the valve mechanism just referred to and which may be of any suitable construction, that shown comprising a casing formed of upper and lower sections 56 and 57 respectively secured together as by the screws 58 and affording a chamber 59 therein into which the disc portion 60 of the rotatable member 61 of the valve extends, the stem of this valve, represented at 62, being journaled in an opening 63 in the casing section 56. The upper end of this stem is shown as connected with a hand-lever 64 through the medium of which this valve may be turned into different positions as desired. The casing section 56 contains four ports 65, 66, 67 and 68, the ports 65 and 67 being diametrically opposed and the ports 66 and 68 diametrically opposed, these several ports opening through that portion of the casing section 56 which forms the upper wall of the chamber 59. The ports 65 and 66 are the ports into which the pipes 53 and 54 open, respectively, and the ports 67 and 68 are exhaust ports. The disc 60 of the valve 62 contains a diametrically-disposed cross-passage 69 terminating in ports 70 and 71, which open through the upper surface of the disc 60, this disc also containing two ports 72 and 73 extending entirely therethrough and opening at their lower ends into the chamber 59 which latter is in communication, through the medium of the pipe 74, with a pipe 75 which opens into the pipe 34 between the valve 35 and the source of fluid pressure supply. The ports 72 and 73 are so disposed relative to the cross-port 69 that when the valve 61 is rotated to a position in which the port 72 communicates with the port 65, to supply fluid pressure to the cylinder 40 above the piston 37, the cross-port 69 will connect the ports 66 and 68 and thereby permit of the escape of pressure from the cylinder 40 below the piston 37, and when the valve 61 is moved to a position in which the port 73 registers with the port 66 for supplying fluid pressure to the cylinder 40 below the piston 37 the cross-port 69 will register with the ports 65 and 67 and thereby provide a vent for the fluid pressure above the piston 37.

The table portion 21 is provided with a depending stud 76 which extends guidingly downward through an opening in the flange 17, the lower end of this stud being threaded and having a nut 77 screwed thereon. The purpose of this stud is to prevent rotation of the piston 19 and the parts carried thereby, in the cylinder 12, and the purpose of the nut 77 is to prevent this piston from being entirely withdrawn from the cylinder when the entire apparatus is lifted, to change its location, as by engaging it at its piston portion 19, with a crane.

In the use of the machine the pattern plate carrying the pattern is placed on the table 21 with the pattern extending upwardly and the flask then applied to the plate and the molding sand then filled into the flask. The jolting mechanism is then operated as hereinbefore stated, for packing the sand around the pattern. The excess sand in the flask is then struck off flush with the top of the flask and the operator then adjusts the four rods 49 to cause them to extend directly beneath the ends of the flask. Where a stripping plate is used these rods would be adjusted to engage with the ends of the stripping plate instead of the flask. When the rods 49 are adjusted as stated, the valve 61 is rotated to a position to introduce air beneath the piston 37 whereupon the piston 37 rises, carrying with it the rods 49 and elevating the flask, and the stripping plate, if used, to a position in which the molded sand is free of the pattern. The mold is then removed and the valve 61 moved to a position in which the fluid pressure enters the cylinder 40 above the piston 37 and forces this piston, together with the parts carried thereby, to normal, lowered, position, Fig. 3.

By preference the various piston and cylinder parts described are enclosed within a casing, the upright walls of which are represented at 78, this casing being mounted upon the base 11. The wall structure 78 contains openings 79 through which the extensions 47 on the piston 37 project, and to prevent access of sand into the casing through these openings I provide the curtains 80 which are mounted on spring rollers 81 journaled in brackets 82 adjacent the upper edge of the wall portions 78, the lower edges of these curtains being connected with the extensions 47, as by means of pins 81 carried by these extensions and extending through openings in the curtains. The curtains therefore travel up and down with the piston 37 and in the upward movement of the latter become automatically rolled upon the rollers 81.

The feature of providing the piston 37 to slide on the cylinder 12 is of great advantage as the piston is thereby positively and stably guided throughout its vertical movement, whereby the lifting of the mold from the pattern may be accomplished without danger of chattering or vibration and a steady draw effected, even when the patterns are relatively deep.

Referring to the construction shown in Fig. 11, this embodiment of my invention is of the same construction as the structure of Figs. 1 to 10 inclusive except, as to the feature of effecting the stripping operation. Instead of providing for the vertical movement of the flash-engaging uprights, through the medium of a single fluid-pressure-operated piston as described of the structure of the preceding figures and which surrounded the member 14, I provide, in the structure now being described, a plurality of fluid-pressure-operated devices for effecting the stripping operation, these devices being provided of any desirable number and grouped about the central post structure of the machine in any desired arrangement best suited for effecting the steady and balanced stripping of the flask from the pattern. Each of these devices comprises a cylinder 83, a piston 84 vertically movable therein, the stem 85 of which is connected at 86 with the member 47, at a point adjacent the outer end thereof, the cylinders 83 being mounted on the base 11 and communicating at their lower ends with pipes 86 connected with a pipe 87 corresponding with the pipe 54 of the preceding figures and through which fluid under pressure enters the cylinders beneath the pistons 84 under the control of the valve mechanism shown in Figs. 7 to 10 inclusive. The upper ends of the cylinders 83 communicate with pipes 88 which open into a pipe 89, corresponding with the pipe 53 of the preceding figures and through which fluid under pressure is conveyed to the cylinders above the pistons 84 therein, under the control of the valve mechanism referred to, it being understood from the foregoing that the supplying of fluid under pressure to the cylinders 83 is simultaneous to effect simultaneous movement of the pistons 84 in both the upward and downward movements of the latter. In the particular construction now being described the member 47 is equipped with a depending sleeve portion, represented at 90, which surrounds the upwardly-extending member 14, forming the jolting cylinder, and has sliding engagement therewith for the guiding purpose, as explained of the sleeve portion 38 of the preceding figures.

Referring to the construction illustrated in Fig. 12, this construction illustrates an embodiment of my invention in a machine suitable for operation by hand, to strip the flask from the pattern and differs from the construction shown in Fig. 11 in the particular that, instead of providing the fluid-pressure-operated mechanisms described, the machine is formed with a shaft 91 journaled in bearings 92 on the base 11, this shaft extending transversely through the center of the member 14, cranks 93 secured to this shaft at opposite sides of the member 14, and pitmen 94 pivotaly connected at their lower ends with the cranks 93 as indicated at 95, and at their upper ends with the member 47, as indicated at 96, the shaft 91 being shown as provided at one end with a crank lever 97 through the medium of which the shaft 91 may be turned to effect the lifting of the member 47 to perform the stripping operation, it being understood that the sleeve 90 performs the same function in this construction as it does in the case of the construction shown in Fig. 11. As the shaft 91 extends centrally through the machine, as stated, it is desirable that the upwardly-extending rods 51 in this construction be located at opposite sides of this shaft, and as Fig. 12 is a central vertical section through the machine, one only of these guide rods is shown, it being preferred that a plurality thereof be employed.

The machines of Figs. 1 to 12 inclusive are each of the type employing jolting mechanism for ramming the sand in the mold. The invention, however, is not limited, in its broadest aspect to embodiment in a machine of this type, but may be embodied in a machine in which this jolting feature is lacking, Fig. 13 illustrating an embodiment of the invention in a machine of the type last referred to.

The machine of Fig. 13 comprises a base portion 98 corresponding with the base 11 and from which rises a post 99, this post, which is shown as of hollow form but which may be solid, if desired, being preferably of cylindrical form and rigidly secured to the base 98. The upper end of the post 99 is shown as equipped with an annular, outwardly-extending, flange 100 upon which a pattern plate, represented at 101, is supported and secured as by the screws 102. The machine also involves means for stripping the flask from the pattern after the flask has been rammed, these means comprising a member 103 corresponding with the member 47 of Fig. 12 and having the upwardly-extending flask-engaging members as in the construction of this last-referred-to figure, the member 103, which is provided with a depending sleeve-like portion 104, corresponding with the part 90, being vertically movable on the post 99.

Any suitable means for effecting the desired vertical movement of the flask-engaging means 103 on the post 98, to effect the stripping operation, may be employed, thus, by way of example, the means shown in the preceding Figs. 1 to 12 inclusive may be incorporated in this structure, the purpose of the showing in Fig. 13 being to illustrate the feature of utilizing the upright on which the pattern is supported, as a means of guiding the stripper mechanism in the vertical movement of the latter.

While I have illustrated and described a number of constructions constituting the embodiment of my invention, I do not wish to be understood as intending to limit the invention thereto, as the same may be embodied in other forms of structures and the structures shown variously modified and altered without departing from the spirit of the invention.

What I claim as new, and desire to secure by Letters Patent, is:

1. In a molding machine, the combination of an upright surmounted by a pattern, and a member movable on, and guided by, said upright and by means of which the mold may be raised relative to the pattern.

2. In a molding machine, the combination of an upright surmounted by a pattern, and a member by which the mold may be raised relative to the pattern having a sleeve portion at which said member is movable on, and guided by, said upright.

3. In a molding machine, the combination of an upright surmounted by a pattern, a member spaced from said upright, a second member by which the mold may be raised relative to the pattern, having a piston portion operating in the space between said upright and said first-named member, and means for supplying fluid-pressure to said portion, for the purpose set forth.

4. In a molding machine, the combination of an upright surmounted by a pattern, fluid-pressure-operated piston and cylinder mechanism surrounding said upright, said piston being movable on, and guided by, said upright, and means operated by said piston for raising the mold relative to the pattern.

5. In a molding machine, the combination of a cylinder, a jolting-piston operating therein, fluid-pressure-operated piston and cylinder mechanism surrounding said cylinder, said piston of said mechanism being movable on, and guided by, said first-named cylinder, and means operated by said last-named piston for raising the mold relative to the pattern.

6. In a molding machine, the combination of a cylinder, a jolting-piston operating therein, and a member movable on, and guided by, said cylinder and by means of which the mold may be raised relative to the pattern.

7. In a molding machine, the combination of a cylinder, a jolting-piston operating therein, a member movable on, and guided by, said cylinder and by means of which the mold may be raised relative to the pattern, and means for operating said member.

8. In a molding machine, the combination of a cylinder, a jolting-piston operating therein, a member movable on, and guided by, said cylinder and by means of which the mold may be raised relative to the pattern, and fluid pressure means for operating said member.

9. In a molding machine, the combination of a cylinder, a jolting-piston operating therein, and a member movable on, and guided by, said cylinder and by means of which the mold may be raised relative to the pattern, said member being formed with a portion surrounding said cylinder.

10. In a molding machine, the combination of a cylinder, a jolting-piston operating therein, a second cylinder, and a member movable on, and guided by, said first-named cylinder and by means of which the mold may be raised relative to the pattern, said member having a piston portion operating in the space between said cylinders, and means for actuating said piston.

11. In a molding machine, the combination of a cylinder, a jolting piston operating therein, a second cylinder surrounding said first-named cylinder and spaced therefrom, a member movable on, and guided by, said first-named cylinder and by means of which the mold may be raised relative to the pattern, said member being formed with a portion surrounding said first-named cylinder and at which it is guided at a relatively long bearing surface thereon, and with a piston portion operating in the space between said cylinders, and means for introducing fluid pressure into said space.

12. In a molding machine, the combination of a rigidly supported upright upon which a pattern is unyieldingly supported in the drawing operation, and a member movable on, and guided by, said upright, and by means of which the mold may be raised relative to the pattern.

13. In a molding machine, the combination of a rigidly supported upright, a jarring member movable on, and into and out of engagement with, said upright, and a member movable on, and guided by, said upright, and by means of which the mold may be raised relative to the pattern.

14. In a molding machine, the combination of a rigidly supported upright upon which a pattern is unyieldingly supported in the drawing operation, a member movable on, and guided by, said upright, and by means of which the mold may be raised relative to the pattern, and fluid pressure means for operating said member.

HENRY TSCHERNING.